(12) United States Patent
Molnar

(10) Patent No.: US 7,085,332 B2
(45) Date of Patent: Aug. 1, 2006

(54) METHOD AND APPARATUS FOR TWO-USER JOINT DEMODULATION IN A SYSTEM HAVING TRANSMIT DIVERSITY

(75) Inventor: Karl James Molnar, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 532 days.

(21) Appl. No.: 10/017,103

(22) Filed: Dec. 14, 2001

(65) Prior Publication Data

US 2003/0112775 A1    Jun. 19, 2003

(51) Int. Cl.
*H04L 27/06* (2006.01)
*H04B 1/69* (2006.01)

(52) U.S. Cl. .................. 375/316; 375/340; 375/148

(58) Field of Classification Search .......... 375/285, 375/262, 341, 340, 350, 346, 267, 347, 316, 375/130, 147, 148, 144, 140; 370/341; 455/132–137
See application file for complete search history.

(56) References Cited

U.S. PATENT DOCUMENTS

| | | | |
|---|---|---|---|
| 5,506,861 A * | 4/1996 | Bottomley | 370/441 |
| 5,887,035 A | 3/1999 | Molnar | |
| 5,930,289 A * | 7/1999 | Laakso et al. | 375/130 |
| 6,304,618 B1 * | 10/2001 | Hafeez et al. | 375/341 |
| 6,477,210 B1 * | 11/2002 | Chuang et al. | 375/340 |
| 6,707,864 B1 * | 3/2004 | Kim | 375/343 |
| 6,775,260 B1 * | 8/2004 | Dabak et al. | 370/342 |
| 2002/0110108 A1 | 8/2002 | Kim et al. | |
| 2002/0136188 A1 | 9/2002 | Kim | |
| 2003/0189992 A1 * | 10/2003 | Nefedov | 375/340 |
| 2004/0174939 A1 * | 9/2004 | Wang | 375/316 |

FOREIGN PATENT DOCUMENTS

| | | |
|---|---|---|
| DE | 19818215 | 11/1999 |
| EP | 0993129 | 4/2000 |
| EP | 1133071 | 9/2001 |
| WO | WO 0000/13383 | 3/2000 |

OTHER PUBLICATIONS

Cozzo et al., "Joint Channel Estimation and Data Detection in space-time communication" IEEE transaction on Communication vol. 51, No. 8, Aug. 2003, pp. 1266-1270.*

(Continued)

*Primary Examiner*—Tesfaldet Bocure
(74) *Attorney, Agent, or Firm*—Moore & Van Allen PLLC; Steven B. Phillips

(57) ABSTRACT

Method and apparatus for two-user join demodulation in a system having transmit diversity. A receiver includes at least a detector unit and a channel estimation unit, and exploits transmit diversity employed by at least one of two users or transmitters on a channel. Symbol detection and channel estimation are performed in block or batch fashion, or recursively on a symbol-by-symbol basis. Joint detection makes use of transmit diversity by at least one of the transmitting users. Channel estimates can be updated using channel tracking. If the signals from the first user and the second user are asynchronous, detection can be accomplished in part through reference to a pulse-shape component. The receiver may be incorporated into a mobile communication terminal.

20 Claims, 14 Drawing Sheets

OTHER PUBLICATIONS

Blanz et al., "Smart Antennas for Combined DOA and Joint Channel Estimation in Time-Slotted CDMA Mobile Radio Systems with Joint Detection," IEEE Transaction on Vehicular Technology Vo., 49, No. 2, Mar. 2000., pp. 293-306.*

H. Arslan et al., "Cochannel Interference Suppression with Successive Cancellation in Narrow-Band Systems", *IEEE Communications Letters*, 5(2):37-39, Feb. 2001.

S. Alamouti, "A Simple Transmit Diversity Technique for Wireless Communications", *IEEE Journal on Sel. Areas of Comm.*, 16(8):1451-1458, Oct. 1998.

E. Lindskog et al., "A Transmit Diversity Scheme for Delay Spread Channels", *submitted to ICC'2000*. pp. 1-5.

E. Lindskog et al., "Time-Reversal Space-Time Block Coding and Transmit Delay Diversity-Separate and Combined". *Submitted to 34th Annual Conference on Signals. Systems and Computers.*. Oct. 29-Nov. : 2000.

S. Wales, Technique for Cochannel Interference Suppression in TDMA Mobile Radio Systems. *IEEE Proc. Comm.* 142(2), Apr. 1995.

P. Ranta et al., "Co-Channel Interference Canceling Receiver for TDMA Mobile Systems". *IEEE ICC*. pp. 17-21, Feb. 1995.

U. Wachsmann et al., "Exploiting the Data-Rate Potential of MIMO Channels: Multi-Stratum Space-Time Coding", *IEEE Veh. Tech. Conf.*, May 2001.

S. Talwar et al., "Blind Separation of Synchronous Co-Channel Digital Signals Using an Antenna Array-Part I: Algorithms". *IEEE Trans. Signal Processing*. 44(5): 1184-1197, May 1996.

S. Talwar et al., "Blind Separation of Synchronous Co-Channel Digital Signals Using an Antenna Array Part II: Performance Analysis", *IEEE Trans. Signal Processing*. 45(3): 706-718, Mar. 1997.

A. Naguib, et al., "Increasing Data Rate Over Wireless Channels". *IEEE Signal Processing Magazine*. 17(3): 76-92, May 2000.

A. Dabak et al., "Equalization and Multi-user Detection for Space Time Block Coding Based Transmit Diversity (STTD) in Frequency Selective Channels". In *Proc. 52nd IEEE Veh Tech Conf.*, Sep. 24-28, 2000.

M. Varanasi et al., "Multistage Detection in Asynchronous Code-Division Multiple-Access Communications". *IEEE Trans. Comm.* 38:508-519, Apr. 1990.

R. Mowbray et al., "Increased CDMA System Capacity Through Adaptive Cochannel Interference Regeneration and Cancellation", *Proc Inst. Elec. Eng.*, pt 1. 139 515-524, Oct. 1992.

R. Konno et al., "Combination of an Adaptive Array Antenna and a Canceller of Interference for Direct-Sequence Spread-Spectrum Multiple-Access System", *IEEE Journal on Sel. Areas of Comm* 8 675-682 May 1990.

L. Lindbom, Simplified Kalman Estimation fo Fading Mobile Radio Channels: High Performance at Ims Computational Load, *In. Proc. Of the Int. Conf. On Acoustics, Speech and Sig. Proc.*, Apr. 1993.

A. Hafeez et al., "Co-channel Interference Cancellation for D-AMPS Handsets", *In Proc. 49th IEEE Veh. Tech. Conf.*, May 1999.

A. Radovic et al., "Iterative Algorithms for Joint Data Detection and Delay Estimation for Code Division Multiple Access Communication System", *In Proc. Ann. Allerton Conf. Commun.*, Control and Computing, Sep./Oct.1999.

K. Giridhar et al., "Nonlinear Techniques for the Joint Estimation of Cochannel Signals", *IEEE Trans. Comm.*, 45(4):473-483, Apr. 1997.

Steiner et al., "Optimum and Suboptimum Channel Estimation for the Uplink of CDMA Mobile Radio Systems With Joint Detection", *European Transaction on Telecommunications, AEI*, Milano, IT, vol. 5. No. 1, (1994) pp. 39-50.

Kocian A., et al., "Interative Joint Ssymbol Detection and Channel Estimation for DS/CDMA Via the Sage Algorithm", *IEEE International Symposium non Personal Indoor and Mobile Radio Communications*, vol. 2, (Sep. 18, 2000) pp. 1410-1414.

* cited by examiner

US 7,085,332 B2

METHOD AND APPARATUS FOR TWO-USER JOINT DEMODULATION IN A SYSTEM HAVING TRANSMIT DIVERSITY

BACKGROUND OF THE INVENTION

The performance of a wireless communication system can be improved through the addition and exploitation of signal "diversity" at one or more points in the system. A signal is said to have diversity when it can be divided into multiple (usually two) different signals, each carrying the same information, but differing in some respect. The term "diversity" typically refers to spatial diversity that results when a signal is sampled at, or transmitted from two different points in space, as by two antennas. In such an arrangement, the signal is said to have a different "diversity branch" for each antenna.

Transmit diversity is an important method for improving reception in the situation where limited diversity is available at the receiver, for example, in the case of single-antenna handsets. If the handset has a priori knowledge of the transmit diversity scheme, the receiver in the handset can use the knowledge to demodulate a signal more effectively in the presence of noise. A space-time block code is used under the assumption of flat channels to achieve the same diversity benefit as would be obtained by maximal ratio combining of signals from two antennas at the receiver. This approach can be extended for dispersive channels.

FIG. 1 illustrates the approach. Base station 101 transmits from two antennas simultaneously. In FIG. 1, two symbols, $a_1$ and $a_2$, are transmitted from two antennas so that the received signal combines the symbols in a favorable manner. During the first transmission, $a_1$ is transmitted from antenna 102 and $a_2$ is transmitted from antenna 103. During the next transmission, $-a_2^*$ is transmitted from antenna 102 and $a_1^*$ is transmitted from antenna 103. Assuming that fading is flat for each signal, Nyquist signaling is used so that there is no inter-symbol interference (ISI) from the filtered and sampled signal, and the channel is constant over the two symbol transmissions. The two received, sampled signals, $r_1$ and $r_2$ can be described by the following vector/matrix form. In the following discussion, lowercase variables denote vector quantities and uppercase variables denote matrix quantities:

$$\begin{bmatrix} r_1 \\ r_2 \end{bmatrix} = \begin{bmatrix} a_1 & a_2 \\ -a_2^* & a_1^* \end{bmatrix} \begin{bmatrix} c_1 \\ c_2 \end{bmatrix} + \begin{bmatrix} \omega_1 \\ \omega_2 \end{bmatrix}$$

where $c_1$ and $c_2$ represent channel estimates between the two antennas and wireless terminal 104 of FIG. 1, and $\omega_1$ and $\omega_2$ represent extraneous noise. For some processing, it is useful to reformulate the channel estimates and symbol representations using $r_2^*$ in place of $r_2$, yielding:

$$\begin{bmatrix} r_1 \\ r_2^* \end{bmatrix} = \begin{bmatrix} c_1 & c_2 \\ c_2^* & -c_1^* \end{bmatrix} \begin{bmatrix} a_1 \\ a_2 \end{bmatrix} + \begin{bmatrix} \omega_1 \\ \omega_2^* \end{bmatrix}.$$

For the kth pair of transmitted symbols $\{a_1(k); a_2(k)\}$, and the kth received sample pair $\{r_1(2k); r_2(2k+1)\}$, the above equations are written as:

$$y_k = A_k c_k + v_k,$$

$$r_k = C_k a_k + \omega_k$$

respectively.

An example receiver used with the transmit diversity system shown above is illustrated in FIG. 2. The receiver includes a vector data generator, 201, a channel estimation unit, 202, and a detector unit, 203. The signal stream is represented by $\{a(k)\}$, a portion of which, $s_p$, is used for channel estimation. The symbols $a_p$ represent symbols from a known pilot field or a known pilot carrier for use in obtaining the estimated channel coefficients. The received samples $\{r(k)\}$ are used to first form the vector $y_p$, which corresponds to the known pilot symbols. These received samples are used to estimate the channel coefficients $\hat{c}$. For example, the channel coefficients can be obtained via least-squares estimation since the symbol data are known. The estimate, $\hat{c}_{LS}$ is given by:

$$\hat{c}_{LS} = (A_p^H A_p)^{-1} A_p^H y_p.$$

This equation reduces to:

$$\hat{c}_{LS} = A_p^H y_p,$$

in the case of flat fading and under the assumption that:

$$|a_1|^2 = |a_2|^2 = 1.$$

Note, there may be more than one known symbol pair, and $\hat{c}_{LS}$ can be easily modified to account for this, under the assumption that the channel is fixed for an estimation period. Once $\hat{c}_{LS}$ is estimated, then the received sample pair $r_k$ corresponding to the unknown transmitted symbol pair $a_k$ is used to detect these symbols. In the case that no known pilot symbols exist, the above estimation approaches can be used iteratively to generate estimates of the channel and detected symbol values.

Increasingly, receiving systems must demodulate and extract information from two users (transmitters) occupying the same bandwidth or channel. In some cases, both signals contain desired information. More typically however, one user is transmitting a desired signal, and a second user represents co-channel interference. Co-channel interference has become a significant problem as the population density of people using wireless, cellular communication devices increases. Because of the traffic demand, it is necessary to re-use channels more frequently on a geographic basis. Joint demodulation schemes have been used successfully to demodulate signals from two users on the same channel. Such schemes do not make use of diversity and only work when the signal-to-noise ratio is fairly high. There are also co-channel interference canceling methods that make use of diversity at the receiver.

BRIEF SUMMARY OF THE INVENTION

The present invention provides methods and apparatus for joint demodulation of signals from two users or transmitters on the same channel. The method of the invention exploits transmit diversity employed by at least one of the users. In one embodiment of the invention, symbol detection and channel estimation are performed in block or batch fashion. The received signal corresponds to a plurality of transmitted symbol sequences or blocks, originating from both a first user and a second user. A stored symbol sequence corresponding to the first user, the first-user symbol sequence, as well as a stored symbol sequence corresponding to the second user, the second-user symbol sequence, are initialized, possibly through a semi-blind initialization procedure. Stored channel estimates are also initialized. In a block-by-block, iterative fashion, received first-user symbol sequences and second-user symbol sequences are jointly and iteratively detected using the channel estimates, and based on the use of transmit diversity by at least one of the users. Detected sequences are used to update stored sequences as all sequences are demodulated. Channel estimates may also be updated on a block-by-block basis, unless they are available from another source, such as an alternate pilot carrier in a code division multiple access (CDMA) system.

In another embodiment, symbols are updated, and channel estimates are updated, if necessary, recursively on a symbol-by-symbol basis. The received signal corresponds to a stream of a plurality of transmitted symbols from each user. A specific first-user symbol and a specific second-user symbol are detected at each of a plurality of symbol times, and stored symbols are updated. The detection process can use previously detected symbols as well as channel estimates. Again, joint detection makes use of transmit diversity by at least one of the transmitting users. Channel estimates can be updated at each current symbol time using channel tracking. If the signals from the first user and the second user are asynchronous, detection can be accomplished through reference to a pulse-shape component.

A receiving system which implements the invention includes a channel estimation unit operable to produce channel estimates for the first user and the second user, and a detector unit operatively connected to the channel estimation unit. The detector unit is operable to jointly detect a first-user symbol sequence and a second-user symbol sequence or first-user and second-user symbols at specific times. The receiving system may also include initialization logic. The detector unit may include a symbol update unit. In one embodiment, the symbol update unit and channel estimation unit are made up of interconnected reformulation operators and conjugation operators which can perform complex conjugate operations, as well as interconnected multipliers and adders. These components may be implemented in hardware, microcode, software, or a combination, and form the means to carry out the invention. In one embodiment they form at least a portion of the baseband logic of a processor controlled, wireless terminal.

DETAILED DESCRIPTION OF THE INVENTION

Figure 1:
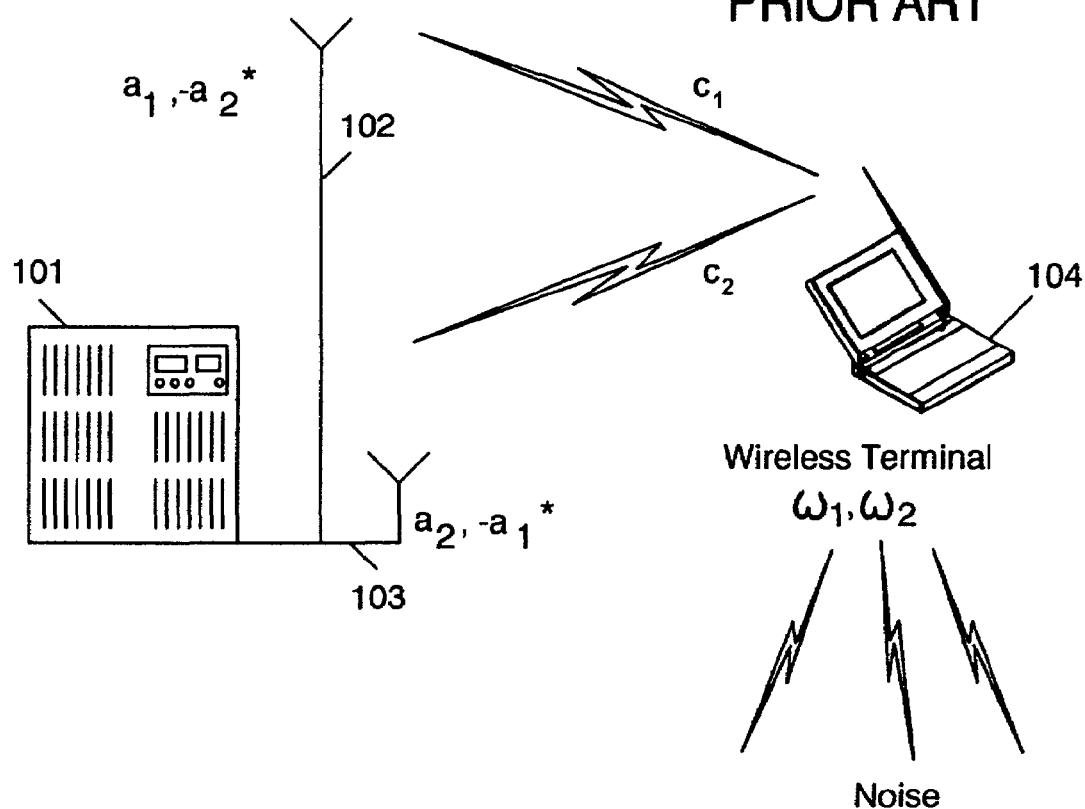
FIG. 1 is a diagram illustrating the concept of transmit diversity through the use of two antennas.
Figure 2:
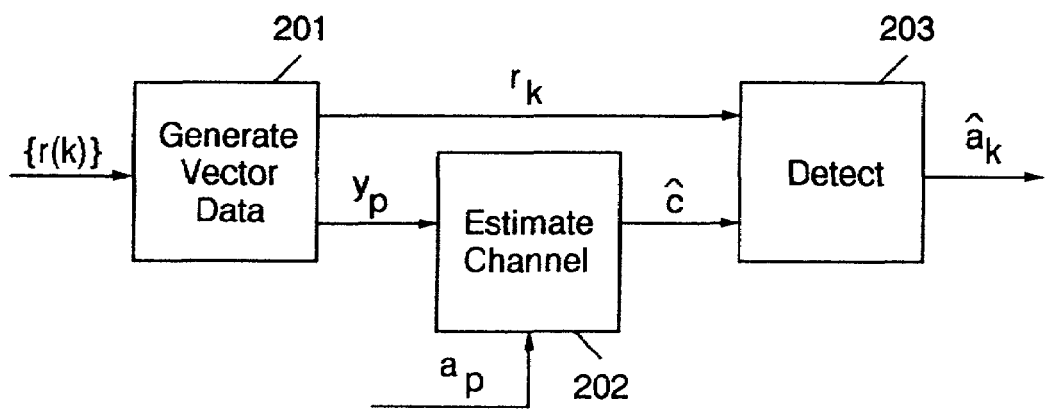
FIG. 2 is a block diagram of a prior-art receiver that makes use of transmit diversity.

The present invention is typically embodied in a receiving system for a communication network where information is transmitted and received as a stream of symbols modulated onto a carrier wave. One example would be a network employing time domain multiplexed access (TDMA). The embodiments disclosed are not restricted to any particular standard, however. The well-known Global System for Mobile (GSM) communication system is one example of a TDMA system which might employ the invention. The invention can also be used in a wireless data network employing code division multiplexed access (CDMA).

It should also be understood that not every feature of the receiving system described is necessary to implement the invention as claimed in any particular one of the appended claims. Various elements of receivers are described to fully enable the invention. It should also be understood that throughout this disclosure, where a process or method is shown or described, the steps of the method may be performed in any order or simultaneously, unless it is clear from the context that one step depends on another being performed first.

Some of the diagrams, which are used to illustrate the inventive concepts, are shown in software flowchart form, while others are shown as block diagrams and signal processing flow diagrams with various operators. The particular form of illustration is selected in each case to aid in understanding the invention. It is to be understood that the concepts discussed can be implemented in hardware or software. For example, a flowchart which is described as a detector unit or a detection method can be thought of as illustrating an algorithm performed by software, or the operation of a specific piece of hardware, such as an application specific integrated circuit (ASIC) that performs the illustrated task.

Finally the usage of terms such as "updating" and "initializing" typically refer to updating symbols or vectors stored or being stored in order to be operated on, decoded, or demodulated. The term user, as in first user and second user is colloquially being used to refer to a transmitter or sender of information, notwithstanding that most aspects of the invention are being implemented in a receiver or a receiver portion of a transceiver in a communication system.

The invention consists of the use of joint detection of at least two users to improve performance. In this approach, the objective is to minimize the quantity:

$$|r-\hat{r}(a,b)|^2$$

under the same assumptions as the single user case, to obtain values for new estimates for users a and b using:

$$a, b = \arg \min_{a,b} |r - \hat{r}(a, b)|^2.$$

An equivalent log-likelihood to be used for detection is:

$$\gamma = Re\{a^H\gamma_a + b^H\gamma_b - a^H H b\}$$

where $H = C^H G$ and the above equation needs to be maximized.

Channel estimates can be obtained via least-squares estimation if the symbol data are known. In the case of flat fading, and assuming $|a|^2 = 1$, they reduce to:

$$\hat{c}_{LS} = A^H y$$

For the two-user scenario, with flat fading, the estimate for two user's channels, c and g, becomes:

$$\begin{bmatrix} \hat{c} \\ \hat{g} \end{bmatrix}_{LS} = \begin{bmatrix} A^H \\ B^H \end{bmatrix} y$$

and this equation shows each user interfering with the other user's channel estimate. An alternative estimation technique is the least-squares estimate with the interfering term removed from the received signal. Now, the estimates for each user's channel can be found using:

$$\hat{c}_{LS} = A^H(y - Bg),$$

$$\hat{g}_{LS} = B^H(y - Ac).$$

Since the interfering users channel estimate must be known in order to find the new estimate, values from prior iterations can be used to calculate new estimates.

One approach is to calculate the single-user estimates using the received signal with the interfering users term removed. Equations for these estimates are written as:

$$\hat{a} = \frac{1}{\alpha} C^H(r - Gb),$$

$$\hat{b} = \frac{1}{\beta} G^H(r - Ca).$$

An assumption is made that the channel estimates for both users are known and prior estimates of the symbol values are available from some prior iteration. The above procedure provides continuous value estimates for the symbols, which may be quantized (hard-detected) to the closest transmit symbol. The channel estimation and detection steps are iteratively computed until some convergence criterion is met or some maximum number of iterations is reached.

Another iterative approach can be used to compute the maximum a poste-riori estimate of the possible transmit symbols. This approach is described in U.S. Pat. No. 5,887,035, which is incorporated herein by reference.

One embodiment of the invention is based on a two-user situation in which the base stations are synchronized. This can easily be accomplished if the system is designed to allow for joint demodulation according to the invention. It is also the case if two users are transmitting from the same base station. In this case, the received signal can be written as:

$$r_k = C_k a_k + G_k b_k + \omega_k$$

where $b_k$ is the vector of symbols transmitted from a second base station and $G_k$ is the corresponding channel response. Different signals are transmitted from the multiple transmit antennas and channel estimates will contain the effects of any transformation from the originating signal stream to the multiple antennas.

For this example, a form of joint detection is illustrated which assumes that both signals use transmit diversity, the medium response is flat faded, channel coefficients are not known, and there are no training symbols. To address this problem, an iterative solution to two suboptimal problems, detection and channel estimation is used. The cases where some of the above quantities are known require some modifications to the approach that can easily be accomplished by one of ordinary skill in the art.

Figure 3:
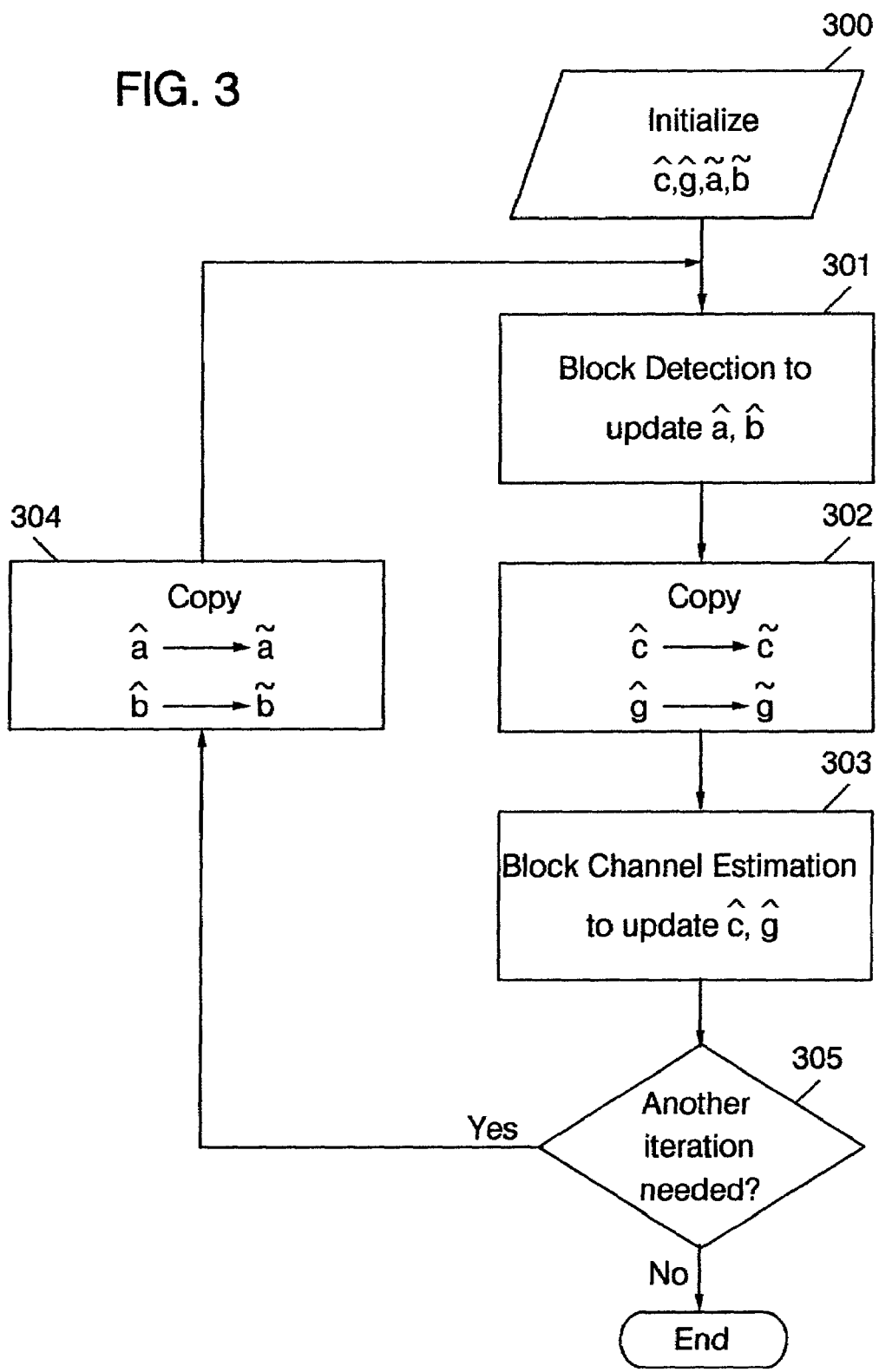
FIG. 3 is a flowchart illustrating the method of the invention according to one embodiment.

Iteration is used to address the transmit diversity problem when multiple users (desired and interfering) are present. Iteration can be performed in a block (i.e. batch) mode, or in a recursive mode of operation. FIG. 3 is a flowchart illustrating one embodiment of the block mode. In this embodiment, a detector unit performs block detection at 301 for the symbols:

$$\hat{a} = \{\hat{a}_1, \ldots, \hat{a}_K\}, \text{ and}$$

$$\hat{b} = \{\hat{b}_1, \ldots, \hat{b}_K\},$$

given channel estimates:

$$\hat{c} = \{\hat{c}_1 \ldots \hat{c}_K\}, \text{ and}$$

$$\hat{g} = \{\hat{g}_1, \ldots \hat{g}_K\}.$$

The terms $\tilde{a}$ and $\tilde{b}$ are either initial values for the first iteration or prior detected values during subsequent iterations. In either case these can be referred to as "previous" values, simply meaning they are already stored and available. These values can be initially set at the initialization step, 300. Initially setting these values to zero results in single-user detection for the first pass of the detector unit. In this example, the channel estimates are represented as complete sequences; however, a small set of channel estimates may be used when the channel is not time-varying or only slowly time-varying.

At step 302 of FIG. 3, the values of $\hat{c}$ and $\hat{g}$ are copied to $\tilde{c}$ and $\tilde{g}$, respectively for further processing in a channel estimation unit at step 303, where new channel estimates are computed. At step 305 a determination as to whether to perform another iteration is made. If another iteration is to be performed, the receiver copies the values $\hat{a}$ and $\hat{b}$ to $\tilde{a}$ and $\tilde{b}$, respectively at step 304. The detector unit calculates the values of $\hat{a}$ and $\hat{b}$ with $\tilde{c}$ and $\tilde{g}$ fixed. The values of $\hat{a}$, $\hat{b}$, $\tilde{a}$ and $\tilde{b}$ may be either hard or soft values.

Figure 4:
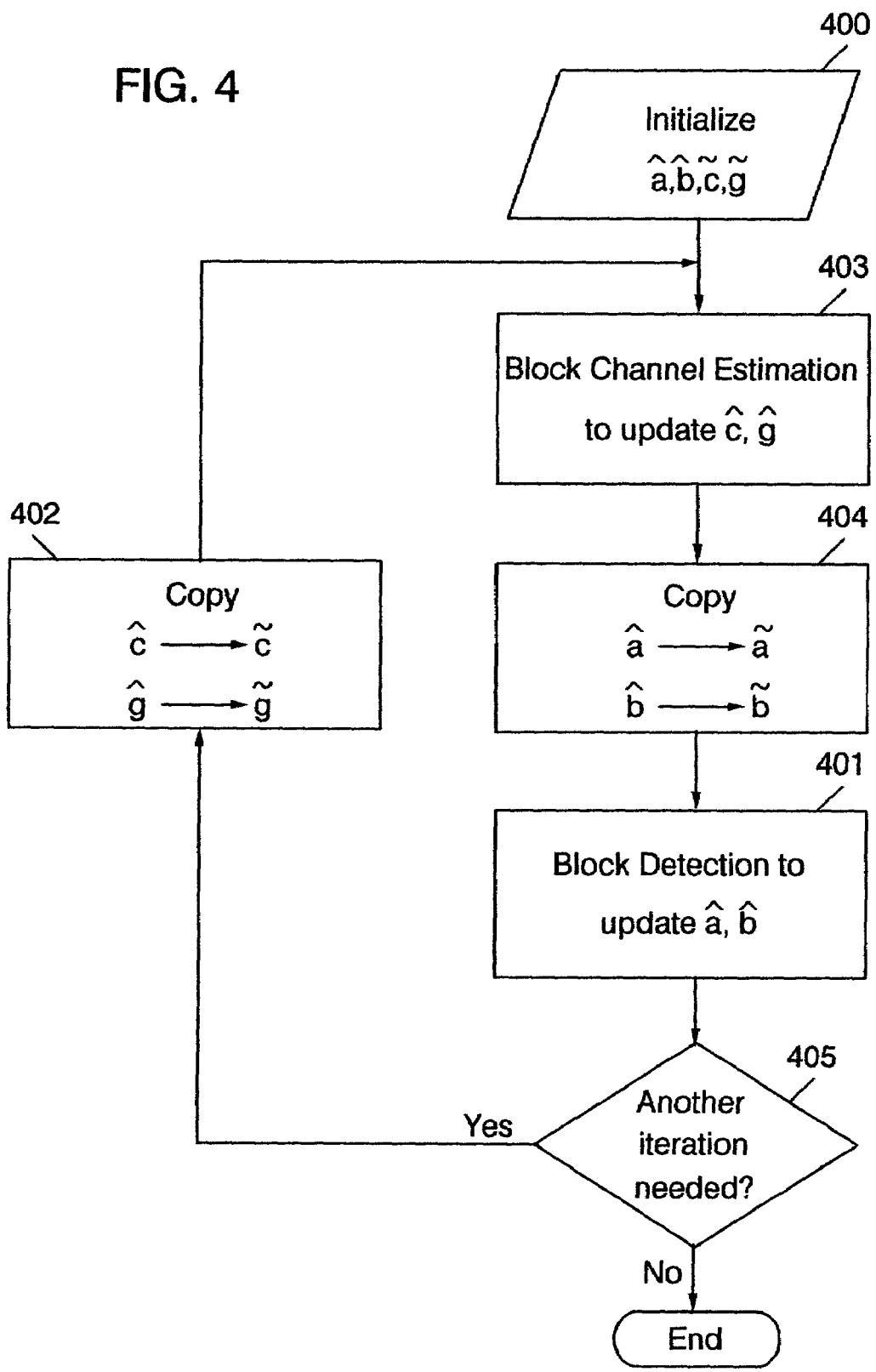
FIG. 4 is a flowchart illustrating the method of the invention according to one embodiment.

FIG. 4 shows a similar embodiment, but initial values are now $\hat{a}$, $\hat{b}$, $\tilde{c}$ and $\tilde{g}$. Setting $\tilde{c}$ and $\tilde{g}$ to have zero initial values at initialization step 400 forces channel estimation at step 403 to perform single-user channel estimation for the first iteration. The rest of the processes are the same, with steps 401, 402, 404, and 405 being essentially the same processes that take place in steps 301, 302, 304, and 305 of FIG. 3. This embodiment is similar to the one shown in FIG. 3, but the iterative algorithm has different starting and termination points.

In the algorithm of FIG. 3, if the channel estimation unit 303 is skipped, then iteration only executes detection at step 301. This approach could be used when channel estimates are known or can be obtained by other means (such as the use of alternate pilot channels in a CDMA system). Similarly, in the second embodiment, if detection at step 401 is skipped during iteration, then only channel estimation at step 403 is executed. This might occur, for example, while detecting known pilot symbols that are being used for initial channel estimation.

Figure 5:
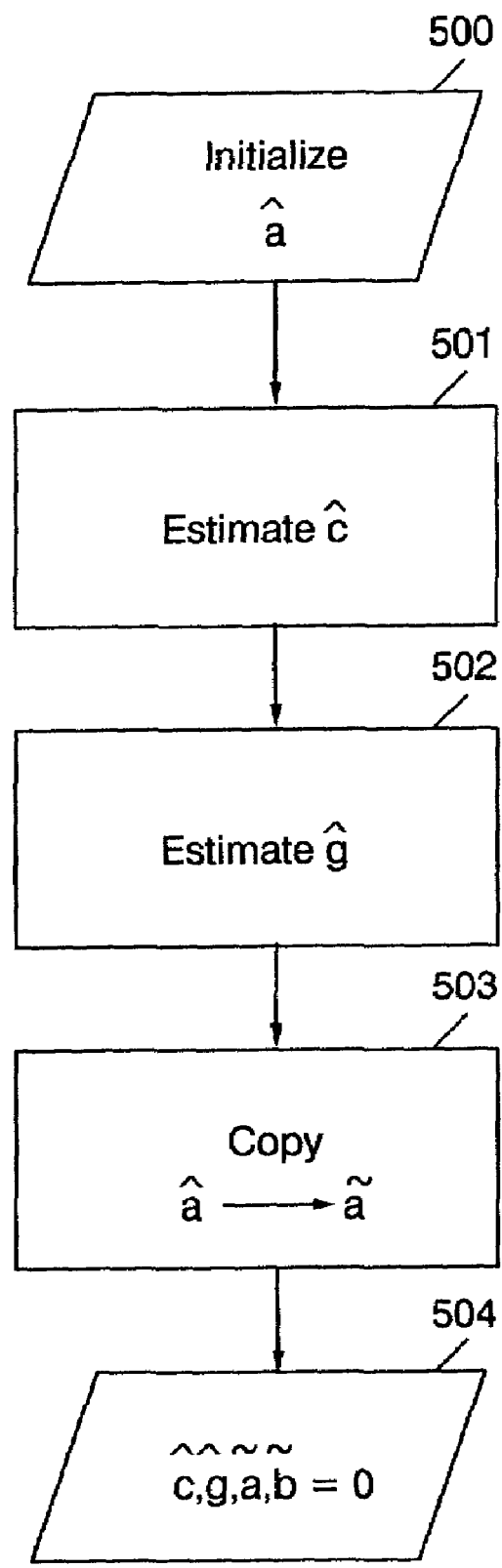
FIG. 5 is a flowchart illustrating a method of blind initialization that can be used in conjunction with the invention.

The initialized values are assumed to be known in the above examples. However, it may be the case that the second user signal is an interferer and the values corresponding to the interferer are unknown. FIG. 5 illustrates a semi-blind initialization procedure that can be used in this case. Assuming that $\hat{a}$ is known and can be initialized at step 500, the single user channel estimate $\hat{c}$ is computed at step 501. Next, some rough estimate of $\hat{g}$ is generated at step 502. Then $\hat{a}$ is copied to $\tilde{a}$ at step 503. $\tilde{b}$ is set to zero and the initial conditions are output at 504.

The rough estimate of $\hat{g}$ discussed above can be obtained by training the desired user's channel estimate over known symbols corresponding to the desired user, while using a sequence estimator to compute the channel estimate for the interfering user. Such an approach is described in U.S. Pat. No. 6,304,618 which is incorporated herein by reference.

Figure 6:
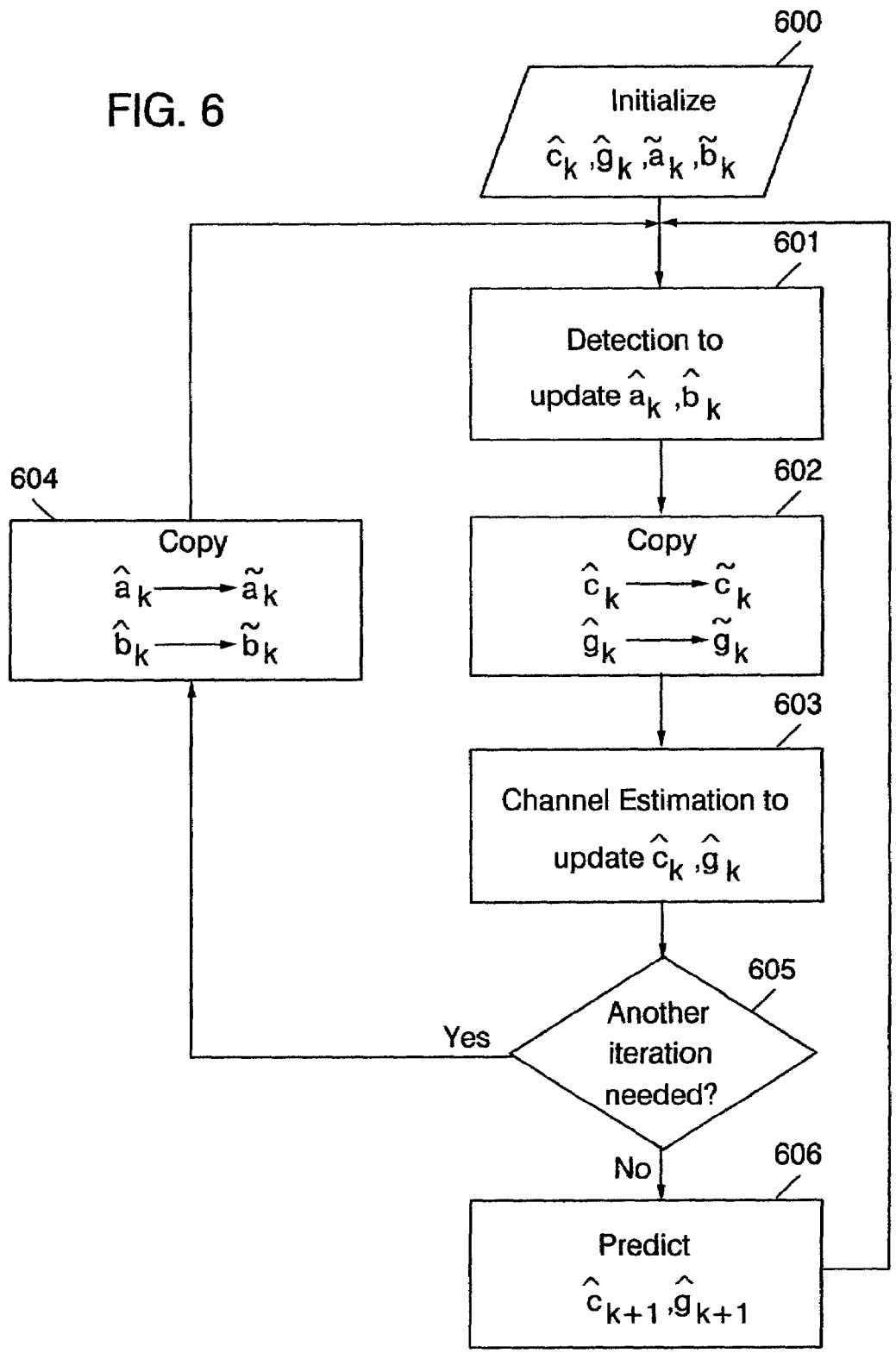
FIG. 6 is a flowchart illustrating the method of the invention according to another embodiment.

Rather than use a block estimation approach, an embodiment that uses recursive estimation can also be used. FIG. 6 shows a flowchart for the update at symbol time k. Steps 601 through 605 are similar to the corresponding steps 301–305 in FIG. 3, however, detection and channel estimation units only operate on the kth symbol or channel estimation term. At step 606 an update is made of the channel estimates from the kth to the (k+1)st symbol time. Known, conventional channel tracking techniques may be used to predict the channel estimates from one time to a future time. A recursive embodiment corresponding to the block approach shown in FIG. 4 can also be developed but is not shown here.

In the case of recursive detection where the signals are synchronous, the detection at each symbol time can be performed separately. There are multiple ways to do this, and one of ordinary skill in the art can select the appropriate way for a proposed system. For the kth symbol time, the problem is to find the values of $\hat{a}_k$ and $\hat{b}_k$ using the equation:

$$\hat{a}_k, \hat{b}_k = \arg \min_{a_k, b_k} |r_k - \hat{r}_k(c_k, g_k)|^2.$$

An equivalent log likelihood to be used for detection is:

$$\gamma = Re\{a^H \gamma_a + b^H \gamma_b - a^H H_k b\},$$

where $H_k = C_k^H G_k$. The object here is to detect the symbol from the first and second user at the current symbol time that maximizes the above equation. Although this can be done directly, each symbol can no longer be detected independently, and so the complexity of the detection procedure is significant.

Figure 7:
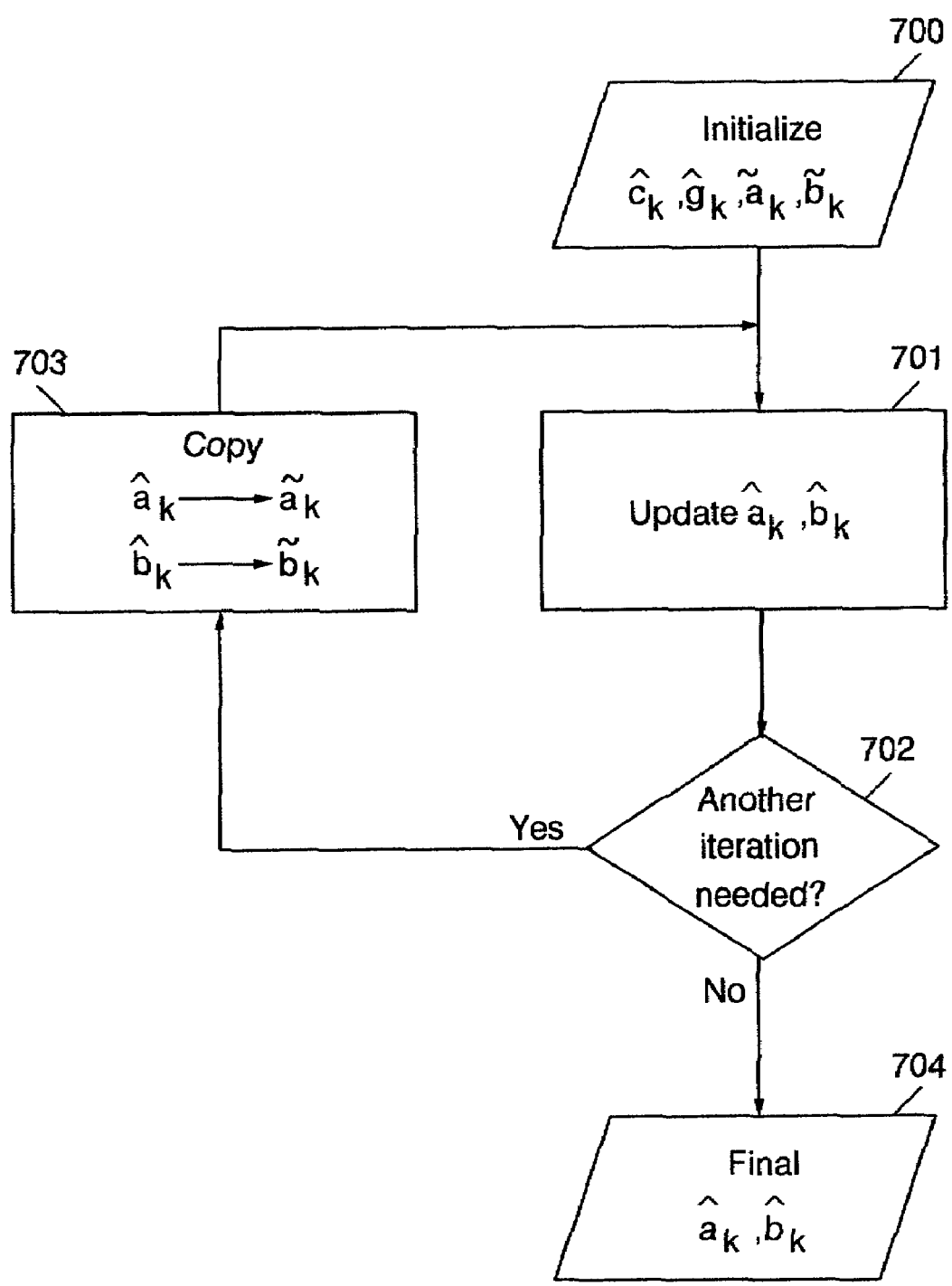
FIG. 7 is a flowchart that illustrates the operation of a detector unit according to an embodiment of the invention.

A lower complexity approach is to calculate the single-user estimates using the received signal with the interfering user terms removed as previously discussed. In the recursive case the equations become:

$$\hat{a}_k = \frac{1}{\alpha} C_k^H (r_k - G_k \tilde{b}_k),$$

$$\hat{b}_k = \frac{1}{\beta} G_k^H (r_k - C_k \tilde{a}_k),$$

where $\tilde{a}_k$ and $\tilde{b}_k$ are previous estimates of $a_k$ and $b_k$, respectively. A flowchart showing the method executed by a detector unit using this approach is shown in FIG. 7. After initialization at 700, an update unit updates of $\hat{a}_k$ and $\hat{b}_k$ using channel estimates $\hat{c}_k$ and $\hat{g}_k$, and prior detected values of $\tilde{a}_k$ and $\tilde{b}_k$ at step 701. At step 702 a determination is made as to whether another iteration is needed. If not, final values of $\hat{a}_k$ and $\hat{b}_k$ are output at 704. If so, current symbol values are copied to prior detected values at step 703.

Figure 8:
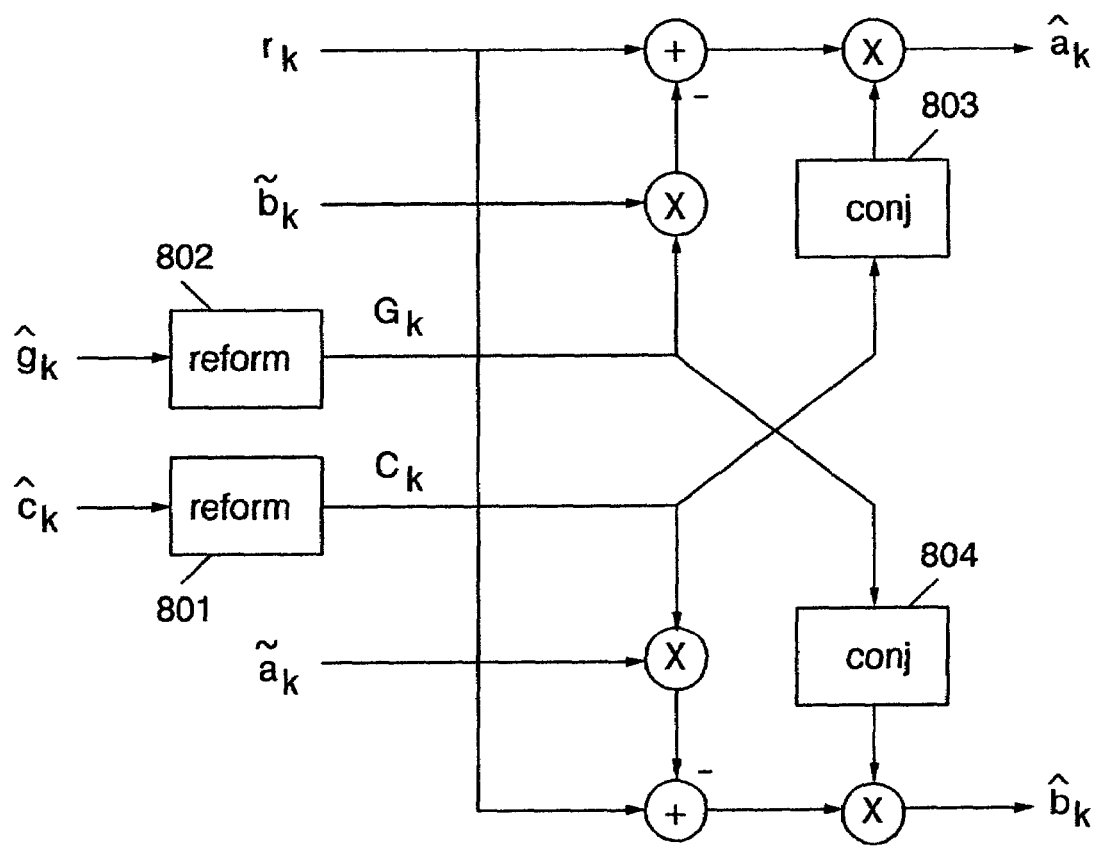
FIG. 8 is a signal processing flow diagram that illustrates a symbol update unit that may be used within the detector unit of FIG. 7.

FIG. 8 shows a signal processing flow/block diagram for a symbol update unit around which a detector unit according to one embodiment of the invention can be build. The values $\hat{c}_k$ and $\hat{g}_k$ are reformed into $C_k$ and $G_k$, respectively, by reformulation operators 801 and 802. Conjugation operators 803 and 804 provide complex conjugate values. Logic such as that shown in FIG. 8 provides continuous, final estimates for the symbols. For symbol aligned signals, batch detection can be accomplished by calling a recursive detection unit once for each symbol time given the appropriate input values for each call.

Alternate detection approaches can be used. For example, rather than use previously detected values for $\tilde{a}_k$ and $\tilde{b}_k$, these terms could be enumerated. Then, the chosen values of $\hat{a}_k$ and $\hat{b}_k$ will be determined by choosing hypotheses that correspond to the best metric. Another alternate detection approach is to compute the maximum a posteriori estimate of the possible transmit symbols. This is more complicated in that probabilities for each transmit symbol are estimated during each iteration. U.S. Pat. No. 5,887,035, previously discussed and incorporated by reference, provides useful background that can be used to develop alternate detection approaches.

The recursive channel estimation problem at time k is to find estimates of $\hat{c}_k$ and $\hat{g}_k$ from the equation:

$$\hat{c}_k \hat{g}_k = \arg \min_{c_k g_k} |y_k - \hat{y}_k(a_k, b_k)|^2.$$

Since joint estimation was previously shown to result in the single-user estimator with interference terms, an approach similar to that employed in detection must be used. The channel update is performed according to the equations:

$$\hat{c}_k = A_k^H (y_k - B_k \tilde{g}_k),$$

$$\hat{g}_k = B_k^H (y_k - A_k \tilde{c}_k)$$

where $\tilde{c}_k$ and $\tilde{g}_k$ are previous estimates of $c_k$ and $g_k$, respectively. Since the interfering user's channel estimate must be known in order to find the new estimate, values from prior iterations can be used to calculate these new estimates.

In the above approach, $\hat{c}_k$ and $\hat{g}_k$ depend only upon the single received sample vector $y_k$, which may be subject to noise and other signal interference. Since there typically is correlation in time from one sample to the next, channel tracking can be used. Consider the least-means-square (LMS) update for the channel coefficient $c_1(k)$. In the case that the transmit diversity approach has two received samples at two different symbol times, $k \in \{2j, 2j+1\}$, the LMS updates are found using the following equations:

$$\hat{c}(2j+1) = \hat{c}(2j) + \mu a_1(k)^* e_1(k),$$

$$\hat{c}(2j+2) = \hat{c}(2j+1) - \mu a_2(k) e_2(k).$$

A similar form exists for the other channel coefficients. Additional background on LMS tracking can be found in Haykin, Adaptive Filter Theory, third edition, Prentice Hall, 1996, which is incorporated herein by reference.

The term $\hat{c}_k$ is the update given a new estimate of $\hat{g}_k$. Using exponential smoothing, this update is written as:

$$\hat{c}_k = (1-\mu)\hat{c}_k + \mu A_k^H (y_k - B_k \hat{g}_k).$$

Letting:

$$e_k = y_k - A_k \hat{c}_k - B_k \hat{g}_k,$$

gives the update:

$$\hat{c}_k = \hat{c}_k + \mu A_k^H e_k,$$

giving LMS-like updates for the vector channel estimates. When no previous estimate for $\hat{c}_k$ is available, then estimates from previous time k−1 can be used to give:

$$\hat{c}_k = \hat{c}_{k-1} + \mu A_k^H e_k.$$

The update for $\hat{g}_k$ is similar.

Figure 9:
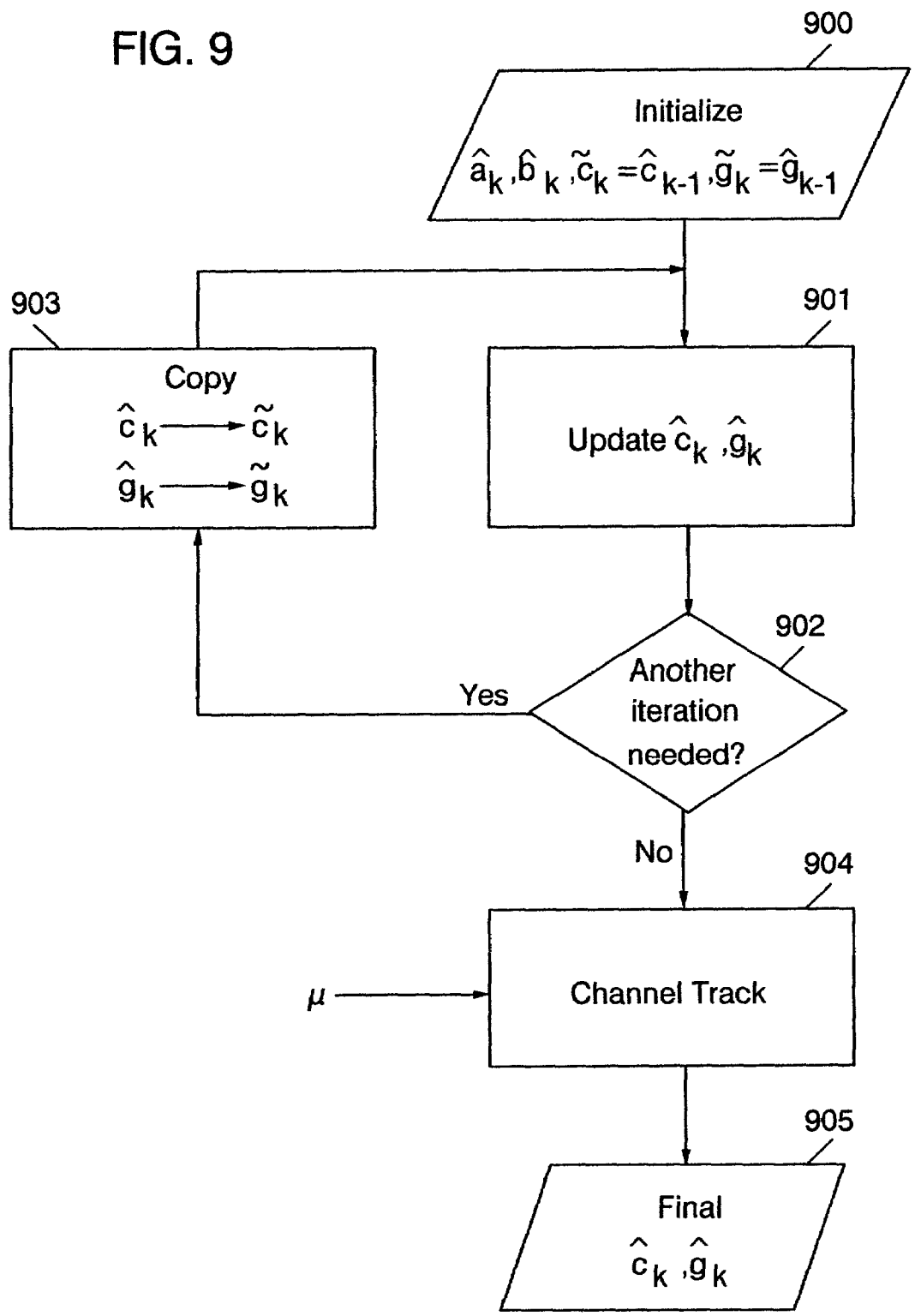
FIG. 9 illustrates the operation of a channel estimation unit according to an embodiment of the invention in flowchart form.

A flowchart for the above approach is shown if FIG. 9. All vectors are initialized at step 900. At step 901, the update as described immediately above is performed. Steps 902 and 903 provide iteration. Once the iteration is complete, channel tracking is performed at step 904 using the step size term as input. Final values are output at step 905.

Figure 10:
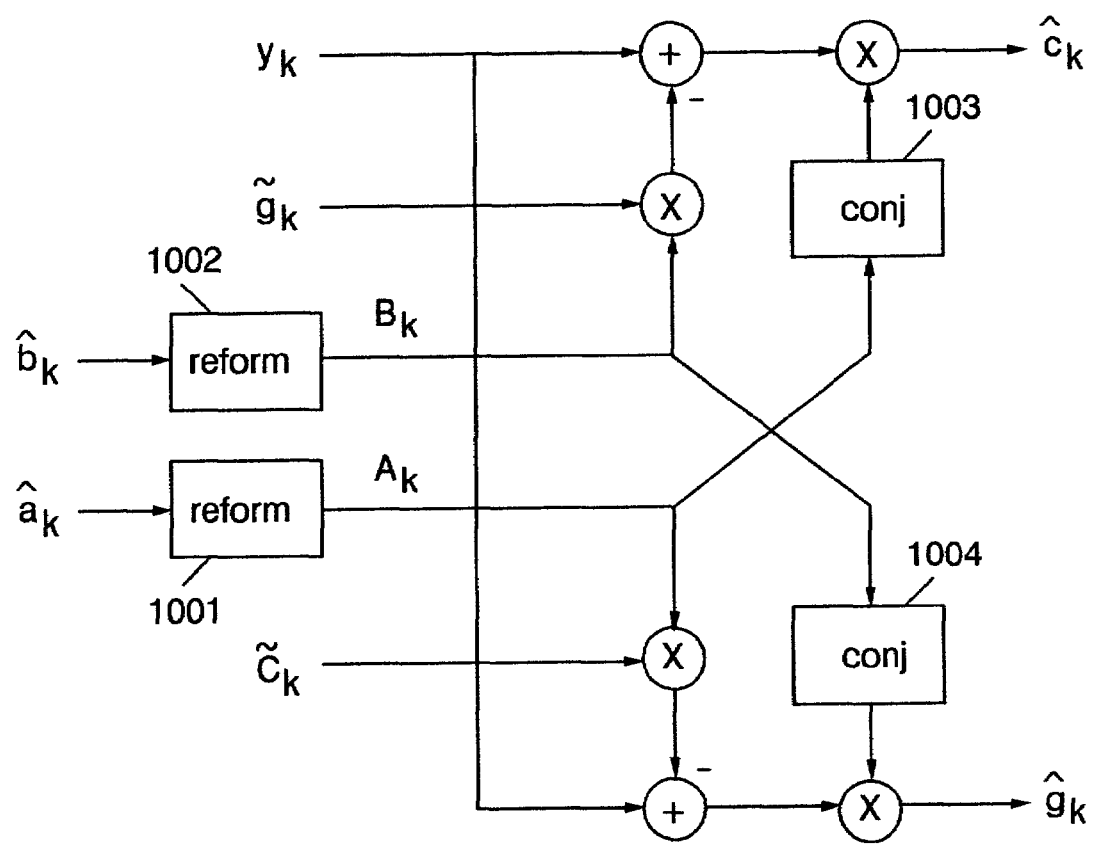
FIG. 10 is a signal processing flow diagram that illustrates the operation of a channel estimation unit according to the invention.

FIG. 10 is a signal flow diagram for a channel estimation unit that is used in performing the method illustrated in FIG. 9. The values $\hat{a}_k$ and $\hat{b}_k$ are reformed into $A_k$ and $B_k$, respectively, by reformulation operators 1001 and 1002. Conjugation operators 1003 and 1004 provide complex conjugate values.

One approach for batch channel estimation is to assume that the channel is fixed so that joint least-squares (LS) estimation can be performed using multiple received samples. This approach can work well since there is no longer an undetermined system of equations that need to be solved. For example, if the received signals $y_k$ through $y_{k+N}$ are used to find the joint LS:

$$\begin{bmatrix} \hat{c}_k \\ \hat{g}_k \end{bmatrix}_{LS} = \left( \begin{bmatrix} A_k & B_k \\ A_{k+1} & B_{k+1} \\ \vdots & \vdots \\ A_{k+N} & B_{k+N} \end{bmatrix} \right)^+ y_k,$$

where $(\ )^+$ is the pseudo-inverse operation. Since the symbol terms may not be able to be pre-computed, a recursive approach may be desired. In this case, the recursive channel tracking approach described above can be used for each symbol.

An alternative approach is needed when the two transmitted user signals are flat faded, but have misaligned symbol timing from each other at the receiver, resulting in intersymbol interference (ISI) from one signal to the other. This ISI appears, even in flat fading, since the pulse-shape responses are aligned so that they no longer have the same zero crossings. With dispersion, sampling the received signal at a higher, but uniform, sampling rate helps make the resulting receiver more tolerant to ISI. A higher sampling rate is required in the case where the medium response is not flat faded and significant dispersion results.

For the scenario above, non-uniform sampling at a rate greater than the symbol rate, but taking into account transmit diversity is used. The approaches discussed previously are modified so that they can be used in this case. Sequence estimation approaches can be modified for use with multi-user transmit diversity, but the same method as previously described for recursive channel estimation is not used. Instead, batch estimation and a sub-optimal, recursive form for detecting symbols and computing channel estimates is employed.

Consider the two-user system described previously, now with symbol misalignment. The received signal is now sampled twice, each sampling time being optimal to one of the transmitted signals in the sense that no own-signal ISI is present for the corresponding signal. Let the sequences of samples for the first signal be represented as $\{r_k^a\}$ and $\{y_k^a\}$. Similarly, the sequences of samples for the second signal are $\{r_k^b\}$ and $\{y_k^b\}$. The signals $\rho_a(j)$ and $\rho_b(j)$ are introduced to represent the pulse-shape response for the first and second signals, respectively. The received signals are then written as:

$$r_k^a = C_k a_k + G_k u_k^a + \omega_k^a,$$

$$r_k^b = C_k u_k^b + G_k^b + \omega_k^b,$$

and:

$$y_k^a = A_k c_k + \Gamma_K^b g_k^a + v_k^a,$$

$$y_k^b = \Gamma_K^a c_k + B_k g_k + v_k^b.$$

Terms listed below are given by:

$$u_k^a = \sum_j \rho_a(j) a_{k+j},$$

$$u_k^b = \sum_j \rho_b(j) b_{k+j},$$

$$\Gamma_k^b = \sum_j \rho_a(j) A_{k+j},$$

$$\Gamma_k^a = \sum_j \rho_b(j) B_{k+j},$$

where the summations above are taken over significant non-zero components of the pulse shape response terms.

In batch mode, detection is performed in the same manner as in the synchronous case. For each symbol time k, the detection approach is used to update $\hat{a}_k$ and $\hat{b}_k$. The ordering of k does not necessarily have to be in natural order $\{1, 2, \ldots, K\}$. After detection, channel estimation is performed using the approach described below. Because of the nature of the channel fading process, updates in natural order are assumed for the recursive channel estimation approach.

Figure 11:
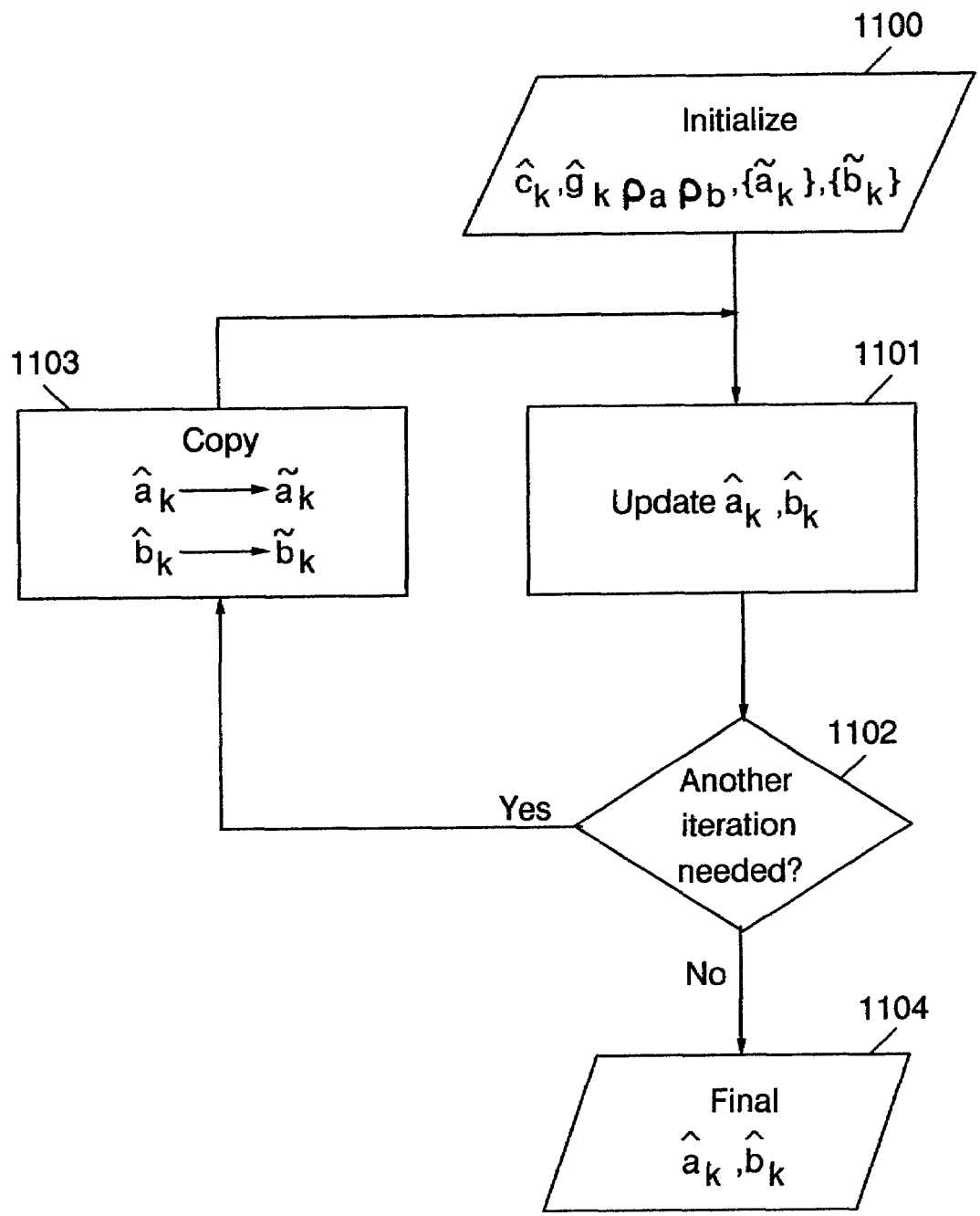
FIG. 11 is a flowchart that illustrates the operation of a detector unit that handles inter-symbol interference (ISI) according to an embodiment of the invention.

For detection, the terms $u_k^a$ and $u_k^b$ are composed of prior, detected symbol values from the kth as well as other symbols from times $j \neq k$. A flowchart for this approach is shown in FIG. 11. The form of this flowchart is similar to previous flowcharts, with initialization taking place at step 1100, iteration being handled by steps 1102 and 1103, and final values being output at 1104. Now, however, step 1101 is a process that performs the symbol update based upon the following equations:

$$\hat{a}_k = \frac{1}{\alpha} C^H (r_k^a - G_k u_k^b),$$

$$\hat{b}_k = \frac{1}{\alpha} G^H (r_k^b - C_k u_k^a).$$

Figure 12:
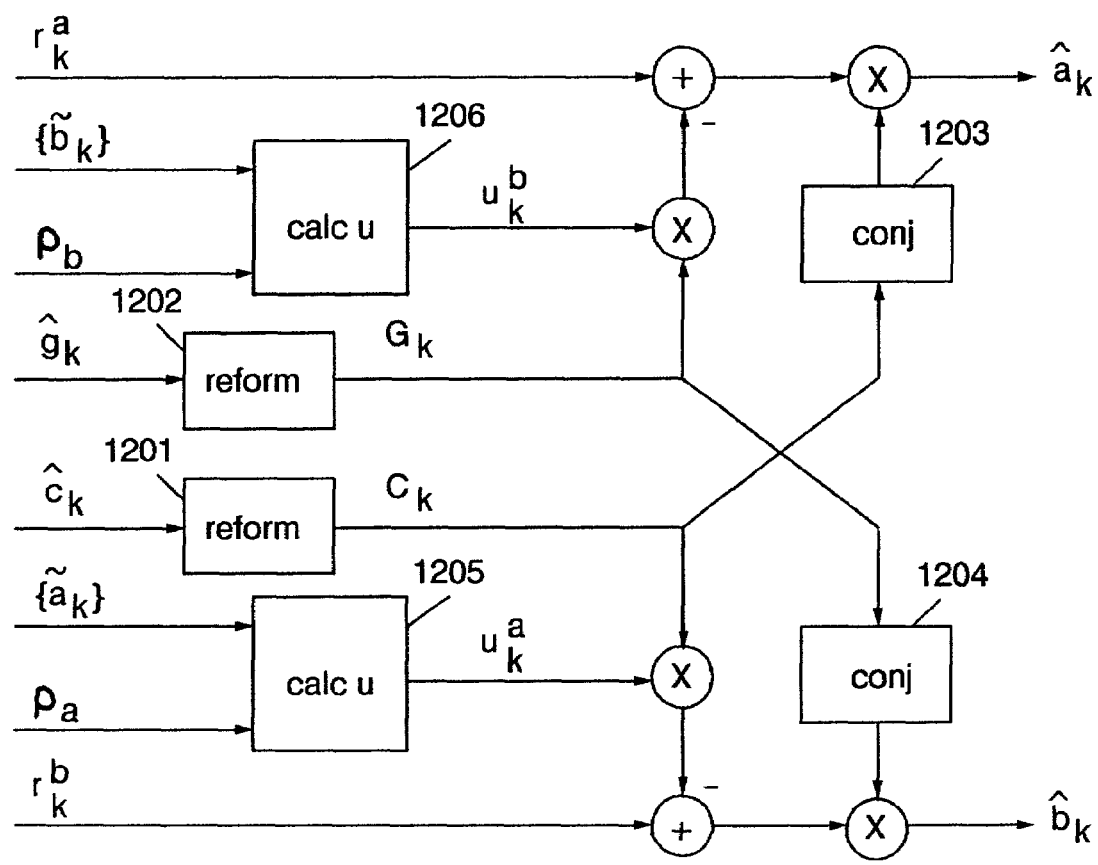
FIG. 12 is a signal processing flow diagram that illustrates the operation of a symbol update unit that handles ISI according to an embodiment of the invention.

The interfering terms are composed of symbols from prior iterations and the pulse shape component. FIG. 12 shows a signal processing flow diagram of a symbol update unit that can be used to perform step 1101 in the flowchart of FIG. 11. The symbol update unit includes reformulation operators 1201 and 1202 and conjugation operators 1203 and 1204 as before. In this case however, calculation units 1205 and 1206 calculate values for the u terms. The interconnections between various other components such as adders and multipliers are shown in the figure.

A recursive channel estimator uses a form similar to that of the synchronous case, and is described by the equations:

$$\hat{c}_k = \hat{c}_{k-1} + \mu_a A^H (y_k^a - \Gamma_k^b g_k),$$

$$\hat{g}_k = \hat{g}_{k-1} + \mu_b B^H (y_k^b - \Gamma_k^a c_k).$$

Figure 13:
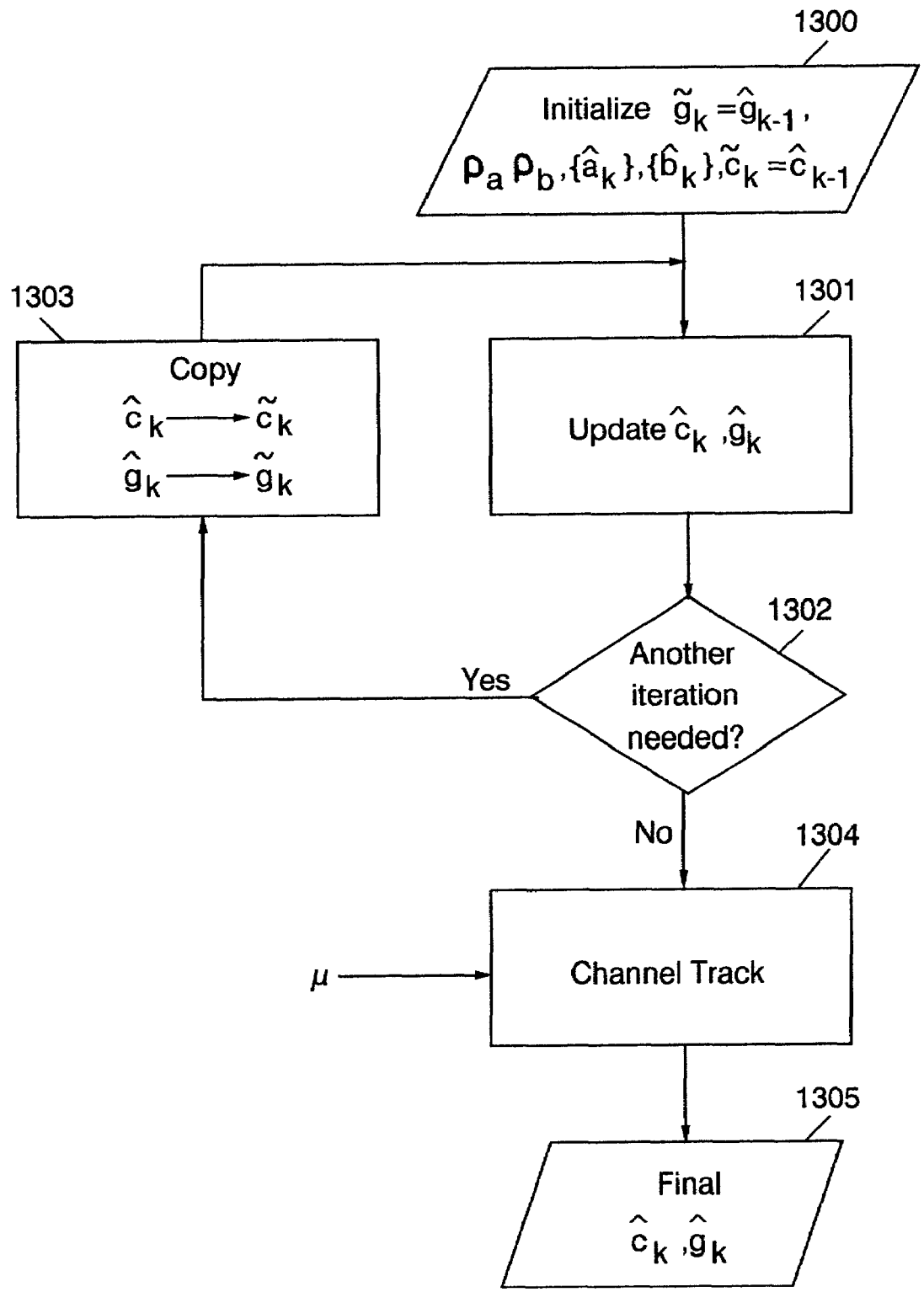
FIG. 13 is a flowchart that illustrates channel tracking according to an embodiment of the invention.

FIG. 13 is a flowchart for the recursive channel estimation. Stored values are initialized at step 1300. At step 1301, the update the update according to the above equations is performed. Steps 1302 and 1302 provide iteration. Once the iteration is complete, channel tracking is performed at 1304 using the step size term as input. Final values are output at step 1305.

Figure 14:
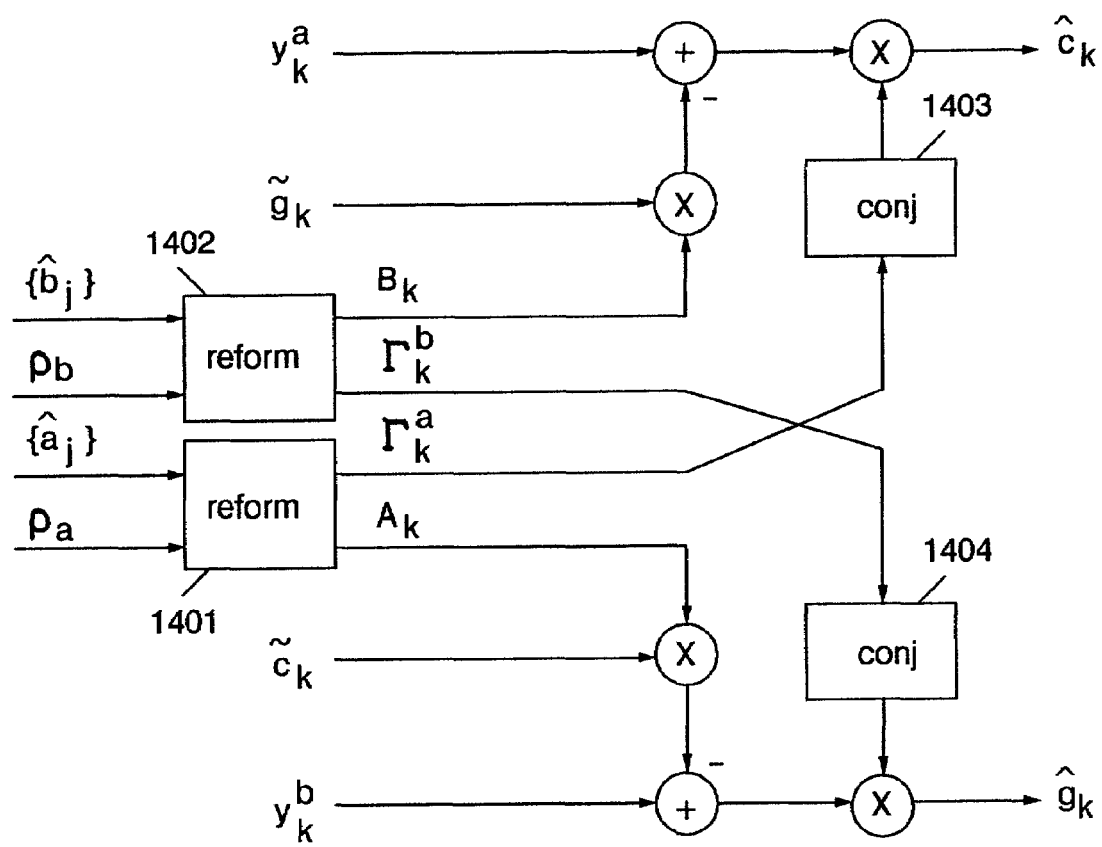
FIG. 14 is a signal processing flow diagram that further illustrates channel tracking according to an embodiment of the invention.

FIG. 14 is a signal processing flow diagram for the update unit that performs the update at step 1301 in FIG. 13. This unit includes operators similar to those previously discussed, including reformulation operators 1401 and 1402 and conjugation operators 1403 and 1404.

A recursive approach can be used with transmit diversity where there is ISI. For the update of the symbols the same detection unit described above is used, but with the following changes. In performing the update of $\hat{a}_k$ using received data sample $y_k^a$, the interference terms $u_k^b$ are made up of hypothesized and/or feedback values of the terms $\hat{b}_j$. From these hypothesized values, different estimates of $\hat{a}_k$ and $\hat{b}_k$ result, and the values that lead to the best metric are detected. Once each symbol is detected at update time k, the recursive approach above is used to perform channel tracking. The detected symbols are used for channel tracking, along with any undetected (hypothesized) symbols that can be obtained from the chosen hypotheses.

In the case that conventional transmission is used with systems that also contain transmit diversity, the invention can still be used. Assume one signal, say $a_k$, is a traditional transmission, and the interferer uses transmit diversity. In this case, assuming $a_1$ and $a_2$ are transmitted at consecutive symbol times corresponding to the transmit diversity symbol time k, then term $y_k$ replaces $A_k$ and $c_k$ as follows:

$$y_k = \begin{bmatrix} a_1 & 0 \\ a_2 & 0 \end{bmatrix} \begin{bmatrix} c_1 \\ 0 \end{bmatrix} + B_k g_k + v_k.$$

Replacing $r_k$, $C_k$, and $a_k$ results in:

$$r_k = \begin{bmatrix} c_1 & 0 \\ 0 & c_1^* \end{bmatrix} \begin{bmatrix} a_1 \\ a_2^* \end{bmatrix} + G_k b_k + \omega_k.$$

The above forms can be used for detection and channel estimation according to the invention in a mixed scenario.

It is also important to understand that the invention can be applied where there are more than two users. In such cases, the technique is applied to two users at a time. Such would be the case, for example, with a multi-input, multi-output (MIMO) system with many users.

Figure 15:
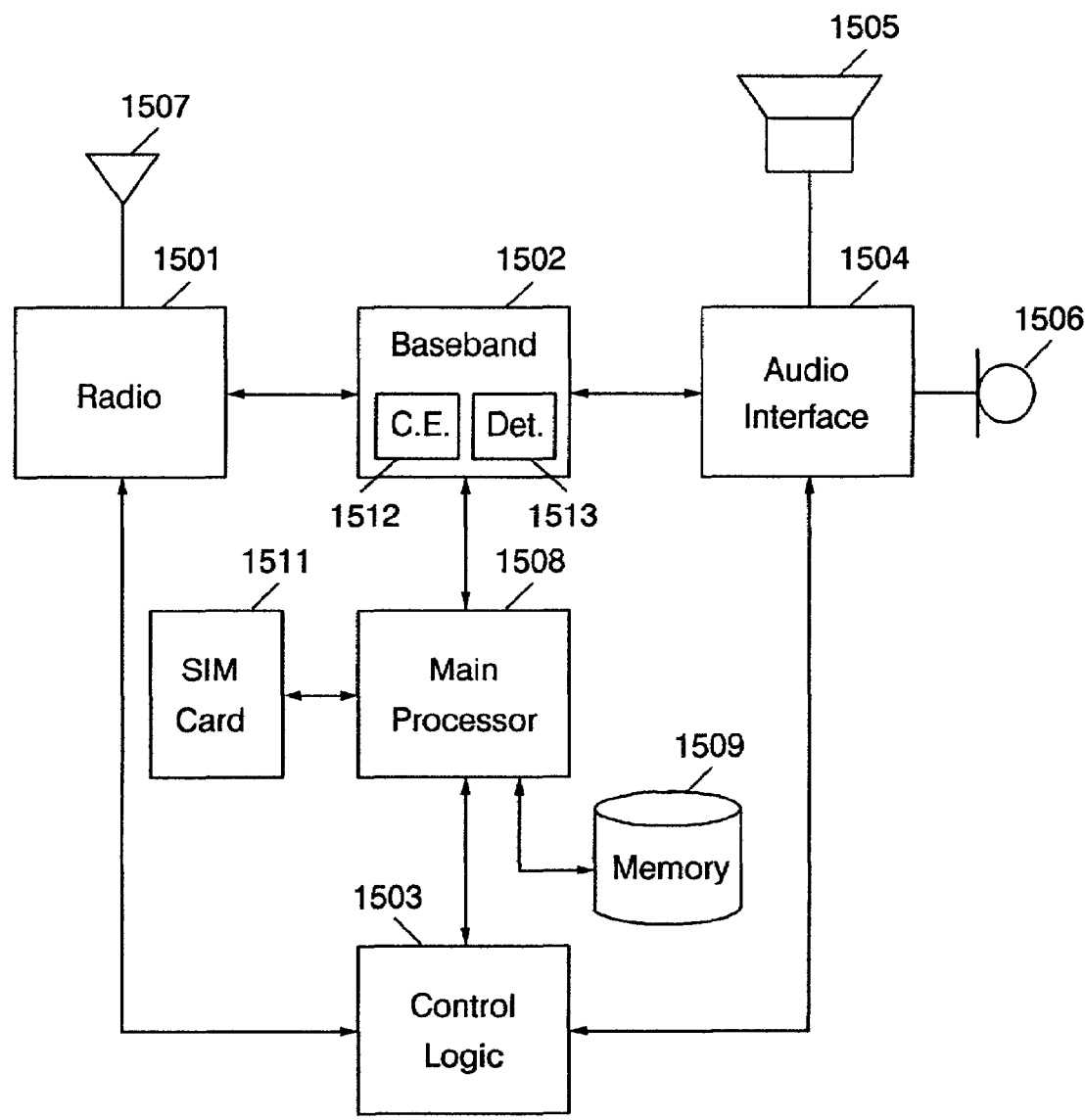
FIG. 15 is a block diagram of a mobile terminal that makes use of the present invention.

FIG. 15 is a block diagram of a mobile terminal that implements the invention. FIG. 15 illustrates a terminal with voice capability, such as a mobile telephone. This illustration is an example only, and the invention works equally well with mobile terminals that are dedicated to communicating with text or other forms of data. Some types of mobile terminals may not contain all of the components shown in FIG. 15. As shown in FIG. 15, the terminal includes radio block 1501, a baseband logic block, 1502, control logic block 1503 and an audio interface block, 1504. Within radio block 1501, the receive and transmit information is converted from and to the radio frequencies (RF) of the various carrier types, and filtering is applied, as is understood in the art. Radio block 1501 includes the preprocessor previously discussed. The terminal's antenna system, 1507, is connected to the radio block. In baseband logic block 1502, basic signal processing occurs, e.g., synchronization, channel coding, decoding and burst formatting. In this example, the baseband logic includes a channel estimation unit, 1512, and a detection unit, 1513, according to the invention. The baseband logic block can be implemented by one or more ASIC'S, or perhaps by a digital signal processor (DSP). Audio interface block 1504 handles voice as well as analog-to-digital (A/D) and D/A processing. It also receives input through microphone 1505, and produces output through speaker 1506. Control logic block 1503, coordinates the aforedescribed blocks and also plays an important role in controlling the human interface components (not shown) such as a key pad and liquid crystal display (LCD). The functions of the aforedescribed transceiving blocks are directed and controlled by one or more microprocessors or digital signal processors such as main processor 1508, shown for illustrative purposes. Program code, often in the form of microcode is stored in memory 1509 and controls the operation of the terminal through the processor or processors. The mobile terminal illustrated in FIG. 15 interfaces to a smart card identity module (SIM), 1511, through a smart card reader interface. The interconnection between the main processor, control logic, memory, and SIM is depicted schematically. The interface is often an internal bus.

A mobile terminal implementation of the invention does not have to be a traditional "cellular telephone" type of terminal, but may include a cellular radio-telephone with or without a multi-line display; a personal communications system (PCS) terminal that may combine a cellular radio-telephone with data processing, facsimile and data communications capabilities; a personal data assistant (PDA) that can include a radiotelephone, pager, Internet/intranet access, Web browser, organizer; and a conventional laptop and/or palmtop computer or other appliance that includes a radio-telephone transceiver. Mobile terminals are sometimes also referred to as "pervasive computing" devices.

Specific embodiments of an invention are described herein. One of ordinary skill in the networking and signal processing arts will quickly recognize that the invention has other applications in other environments. In fact, many embodiments and implementations are possible. In addition, the recitation "means for" is intended to evoke a means-plus-function reading of an element in a claim, whereas, any elements that do not specifically use the recitation "means for," are not intended to be read as means-plus-function elements, even if they otherwise include the word "means." The following claims are in no way intended to limit the scope of the invention to the specific embodiments described.

What is claimed is:

1. A method of demodulating a received signal corresponding to a plurality of transmitted symbol sequences originating from both a first user and a second user, the method comprising:
   initializing, using known pilot symbols for the first user and the second user, a first-user symbol sequence corresponding to the first user and a second-user symbol sequence corresponding to the second user and channel estimates far the first user and the second user wherein the first user and the second user can be asynchronous; and
   jointly detecting the first-user symbol sequence and the second-user symbol sequence using, at each of a plurality of iterations previous first and second user symbol sequences and the channel estimates for the first user and the second user, and based on the use of transmit diversity by at least one of the first user and the second user and on a pulse shape component and symbols from prior iterations.

2. The method of claim 1 further comprising updating the channel estimates prior to each of the plurality of iterations.

3. The method of claim 1 wherein channel estimates are obtained using alternate pilot channels in a code division multiplexed access (CDMA) system.

4. A method of demodulating a received signal corresponding to a plurality of transmitted symbols originating from both a first user and a second user, the method comprising:
   initializing a pulse-shape component, using known pilot symbols for the first user and the second user, a first-user symbol corresponding to the first user and a second-user symbol corresponding to the second user and channel estimates for the first user and the second user wherein the first user and the second user can be asynchronous;
   jointly detecting a first-user symbol and a second-user symbol at a current symbol time using previous first and second user symbols and channel estimates for the first user and the second user and the pulse-shape component, and based on the use of transmit diversity by at least one of the first user and the second user; and
   if additional symbol times remain, jointly detecting the first user symbol and the second user symbol at a next symbol time.

5. The method of claim 4 further comprising:
   predicting the channel estimates for a next symbol time, at least in part through the use of channel tracking; and
   updating the first-user symbol and the second-user symbol.

6. The method of claim 4 where the jointly detecting can be accomplished at least in part by estimating the plurality of symbols out of natural order.

7. Apparatus for demodulating a received signal corresponding to a plurality of transmitted symbol sequences originating from both a first user and a second user, the apparatus comprising:
   means for initializing, using known pilot symbols for the first user and the second user, a first-user symbol sequence corresponding to the first user and a second-user symbol sequence corresponding to the second user wherein the first user and the second user can be asynchronous;
   means for initializing channel estimates for the first user and the second user, using the known pilot symbols for the first user and the second user; and
   means for iteratively and jointly detecting the first-user symbol sequence and the second-user symbol sequence using previous first and second user symbol sequences and the channel estimates for the first user and the second user, and based on the use of transmit diversity by at least one of the first user and the second user and on a pulse shape component and symbols from prior iterations.

8. A receiving system operable to demodulate a received signal corresponding to a plurality of transmitted symbol sequences originating from both a first user and a second user, the system comprising:
   a channel estimation unit operable to produce channel estimates for the first user and the second user, using known pilot symbols for the first user and the second user, and
   a detector unit operatively connected to the channel estimation unit, the detector unit operable to jointly detect a first-user symbol sequence and a second-user symbol sequence using previous first and second user symbol sequences, the known pilot symbols for the first user and the second user, and the channel estimates for the first user and the second user, wherein the first user and the second user can be asynchronous, and based on the use of transmit diversity by at least one of the first user and the second user and on a pulse shape component and symbols from prior iterations.

9. The system of claim 8 wherein the channel estimation unit updates the channel estimates prior to each of a plurality of iterations.

10. The system of claim 8 wherein the channel estimation unit obtains channel estimates using alternate pilot channels in a code division multiplexed access (CDMA) system.

11. A receiving system operable to demodulate a received signal corresponding to a plurality of transmitted symbols originating from both a first user and a second user, the system comprising:
   a channel estimation unit operable to produce channel estimates for the first user and the second user, using known pilot symbols for the first user and the second user; and
   a detector unit including a symbol update unit, the detector unit operatively connected to the channel estimation unit, the detector unit operable to jointly detect a first-user symbol and a second-user symbol at specific symbol times using previous first and second user symbols, the known pilot symbols for the first user and the second user, and the channel estimates for the first user and the second user, as well as a pulse-shape component and symbols from prior iteration, wherein the first user and the second user can be asynchronous, and based on the use of transmit diversity by at least one of the first user and the second user;

and wherein both the symbol update unit and channel estimation unit further comprise reformulation operators, conjugation operators connected to the reformulation operators, and multipliers and adders interconnected with the reformulation operators and conjugation operators.

12. The system of claim 11 wherein the channel estimation logic predicts channel estimates at least in part through channel tracking.

13. The receiving system of claim 11 wherein the detector unit is further operable to detect the first user symbol and the second user symbol out of natural order.

14. A mobile terminal comprising:
a processor system for controlling the operation of the mobile terminal;
a radio block operable to transmit signals, and also to receive signals corresponding to a plurality of transmitted symbols originating from both a first user and a second user;
baseband logic operatively connected to the radio block and the processor system, the baseband logic further comprising a channel estimation unit operable to produce channel estimates for the first user and the second user, using known pilot symbols for the first user and the second user, and a detector unit operatively connected to the channel estimation unit, the detector unit operable to jointly detect first-user symbols and second-user symbols based on the channel estimates for the first user and the second user, and using the known pilot symbols for the first user and the second user, wherein the first user and the second user can be asynchronous, and based on the use of transmit diversity by at least one of the first user and the second user and on a pulse shape component and symbols from prior iterations.

15. The mobile terminal of claim 14 wherein the channel estimation unit performs block estimation and the detector unit performs block detection of the first user symbols and the second user symbols.

16. The mobile terminal of claim 14 wherein the channel estimation unit performs recursive estimation using channel tracking and the detector unit performs recursive detection of the first user symbols and the second user symbols.

17. The mobile terminal of claim 16 wherein the detector unit further comprises a symbol update unit, and the symbol update unit and the channel estimation unit each further comprise:
reformulation operators;
conjugation operators connected to the reformulation operators; and
multipliers and adders interconnected with the reformulation operators and conjugation operators.

18. The mobile terminal of claim 14 wherein the channel estimation unit produces channel estimates by referring to alternate pilot channels in a code division multiplexed access (CDMA) system.

19. The mobile terminal of claim 14 wherein the detector unit further comprises a symbol update unit, and the symbol update unit and the channel estimation unit each further comprise:
reformulation operators;
conjugation operators connected to the reformulation operators; and
multipliers and adders interconnected with the reformulation operators and conjugation operators.

20. The mobile terminal of claim 14 wherein the detector unit is further operable to detect the first user symbol and the second user symbol out of natural order.

* * * * *